United States Patent [19]

Herbulot et al.

[11] Patent Number: 4,505,363
[45] Date of Patent: Mar. 19, 1985

[54] TWIN-DISC BRAKE HAVING AXIALLY SLIDING CALIPERS

[75] Inventors: Jean Herbulot, Franconville; Bernard Jumel, Pierrefitte, both of France

[73] Assignee: VALEO, Paris, France

[21] Appl. No.: 436,818

[22] Filed: Oct. 26, 1982

[30] Foreign Application Priority Data

Nov. 4, 1981 [FR] France ............... 81 20658

[51] Int. Cl.³ ............... F16D 55/224; F16D 55/40; F16D 65/20
[52] U.S. Cl. ............... 188/72.5; 188/73.39; 188/73.43
[58] Field of Search ............ 188/18 A, 72.5, 72.4, 188/71.6, 71.5, 73.39, 73.43, 73.44, 73.45, 73.46, 264 A, 264 AA, 366–370, 71.3, 71.4

[56] References Cited

U.S. PATENT DOCUMENTS

| 3,966,025 | 6/1976 | Newstead | 188/72.5 |
| 4,064,974 | 12/1977 | Filderman | 188/72.5 X |
| 4,117,911 | 10/1978 | Vacval et al. | 188/18 A X |

FOREIGN PATENT DOCUMENTS

| 2141857 | 3/1972 | Fed. Rep. of Germany . |
| 1105683 | 12/1955 | France . |
| 1459110 | 10/1966 | France . |
| 1538138 | 7/1968 | France . |
| 2232702 | 1/1975 | France . |
| 2314399 | 1/1977 | France . |
| 2364368 | 4/1978 | France . |
| 734271 | 7/1955 | United Kingdom . |
| 734856 | 8/1955 | United Kingdom . |
| 2074265 | 10/1981 | United Kingdom . |
| 2109068 | 5/1983 | United Kingdom ........ 188/72.5 |

Primary Examiner—Douglas C. Butler
Attorney, Agent, or Firm—Young & Thompson

[57] ABSTRACT

A twin-disc brake comprises a fixed support, extending over an angular sector of about 180°, and common to two calipers associated each with a respective disc. The calipers are mounted so as to slide axially along guides in the support and have hydraulic cylinders arranged on only one side of the associated disc, each caliper presents a reaction face for the pads on the other side of the associated disc. The brake is axially compact.

19 Claims, 7 Drawing Figures

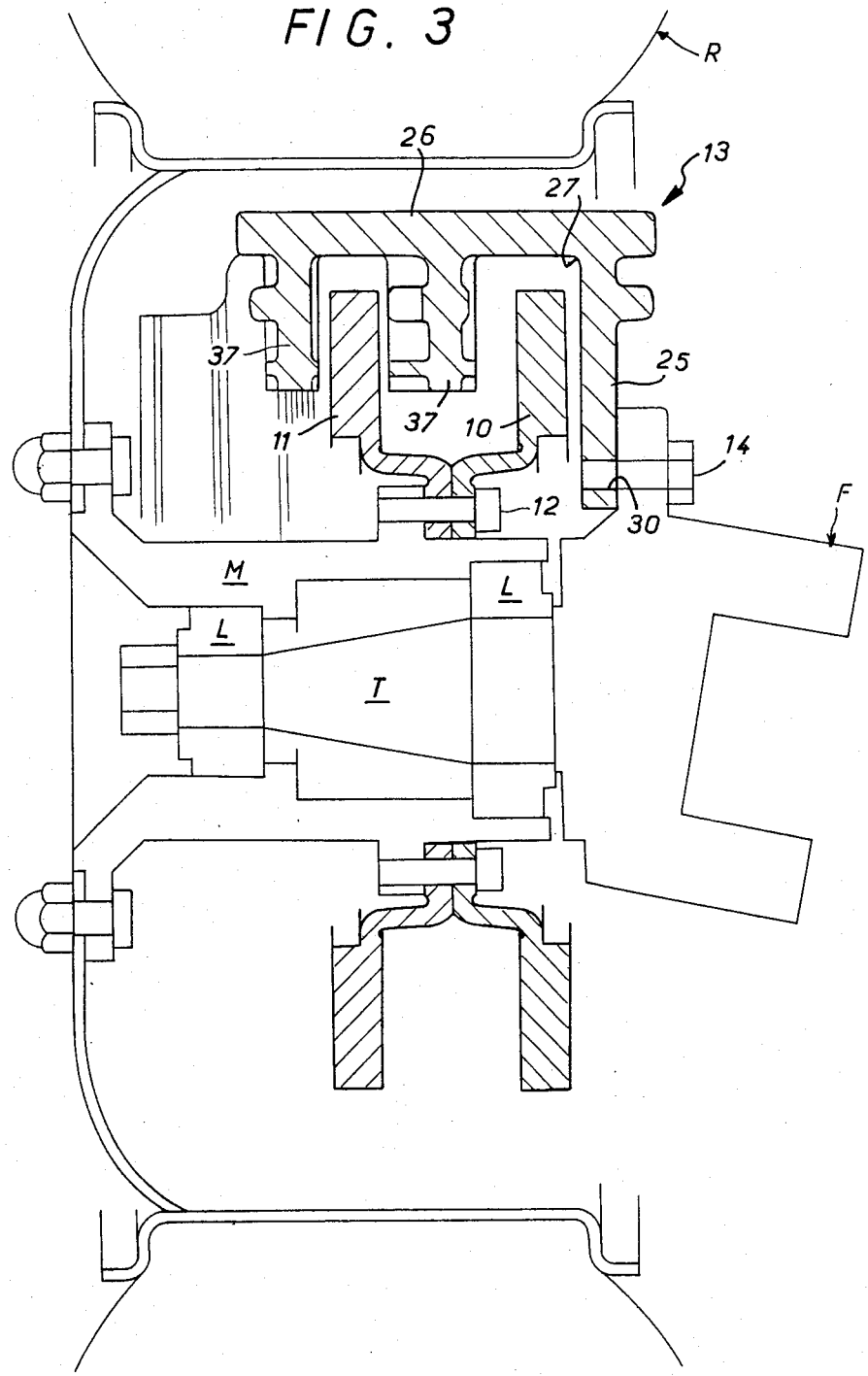

TWIN-DISC BRAKE HAVING AXIALLY SLIDING CALIPERS

BACKGROUND OF THE INVENTION

The present invention relates to a twin-disc brake comprising two adjacent rotating discs and two angularly fixed calipers associated respectively with the two discs, each caliper having hydraulic cylinder means receiving piston means capable of applying the pad means axially against the associated disc.

In general, a twin-disc brake is constructed by placing two single-disc brakes circumferentially next to one another. This procedure uses to advantage the traditional technique of single-disc brakes, but has the disadvantage of poor cooling. In fact, the whole circumference of the discs is in practice occupied by the brake components, which leaves insufficient space for ventilation. Moreover, at least some of the brake components and some of their control components are directly exposed to the weather and mud.

To overcome these disadvantages, it has already been proposed to bring the various components of the twin-disc brake together in an angular sector of about 180°, which makes it possible amply to expose the discs to the open air adjacent this sector, for goods cooling of the brake. In general, in such brakes, the calipers are fixed both angularly and axially, which involves the presence of hydraulic cylinder means on both sides of each disc for the clamping of the latter between the pads. This type of duplication of the hydraulic cylinder means results in a considerable axial bulk and a high cost.

The present invention relates to a twin-disc brake which is devoid of these disadvantages and in which the calipers are moved towards one another circumferentially so as to leave the discs free over a wide sector, for good ventilation, and in which each caliper is nevertheless of a sliding type with hydraulic cylinder means on only one side of the associated discs, in order to reduce the axial bulk of the brake.

SUMMARY OF THE INVENTION

A twin-disc brake according to the invention, of the type indicated above, is characterised in that it comprises a fixed support which is common to the two calipers and which extends over an angular sector of about 180°, and in that the two calipers consist of parts in the form of riders, engaged so as to slide axially in guide means in the common fixed support, the calipers being arranged on this common fixed support circumferentially adjacent one another, and the hydraulic cylinder means of each caliper being arranged on only one side of the associated disc, whilst, on the other side, the caliper presents a reaction face for the pad means.

By virtue of this arrangement, the brake has a circumferential bulk reduced to about 180°, which makes it possible to free an opposite sector, in which the discs are in direct contact with the air and are well cooled. Moreover, the brake is of simplified construction with only three parts: the common support and two calipers, which are advantageously identical. Each caliper possessing hydraulic cylinder means on only one side has a reduced axial bulk and a low cost.

Preferably, the hydraulic cylinder means of each caliper are arranged on the outside of the associated disc.

According to another characteristic, the common fixed support comprises a flange perpendicular to the axis, arranged in the vicinity of and next to the discs, and two pairs of guide bearings, firmly fixed to this flange, for guiding the calipers. This gives a particular simple and robust construction for this common fixed support.

Preferably, the bearings of one of the pairs of guide bearings, associated with one of the calipers, run along the edge of a housing provided in the support for the said caliper, this housing being closed on one side by the flange, whilst the bearings of the other pair of guide bearings, associated with the other caliper, run along the edge of another housing provided in the support for this other caliper, the latter housing being open on both sides.

In one embodiment of the invention, the common fixed support comprises a cylindrical rim firmly fixed to the flange, and the two pairs of guide bearings are formed respectively by the edges of two openings which are provided in the cylindrical rim of the common fixed support.

According to another characteristic, the common fixed support comprises gussets perpendicular to the axis, whilst the flange and these gussets possess thrust bearings for the pad means.

Preferably, the hydraulic cylinder means of each caliper are arranged on the outside of the associated disc.

BRIEF DESCRIPTION OF THE DRAWINGS

FIG. 3 is a view of the brake in cross-section along the line III—III of FIG. 1, and shows the vehicle wheel to which this brake is fitted;

DESCRIPTION OF THE PREFERRED EMBODIMENT

Figure 1:
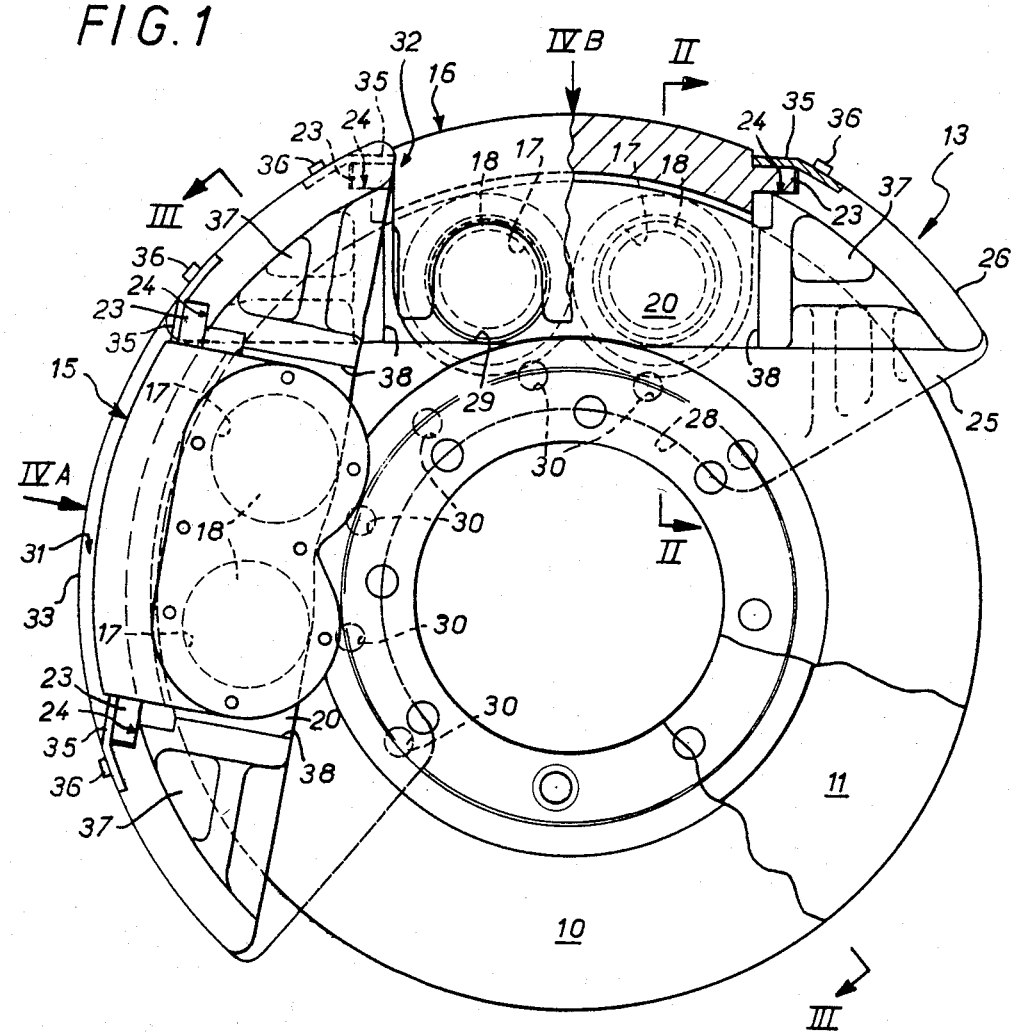
FIG. 1 is a view in elevation of a twin-disc brake according to the invention, with a partial cut-away.
Figure 2:
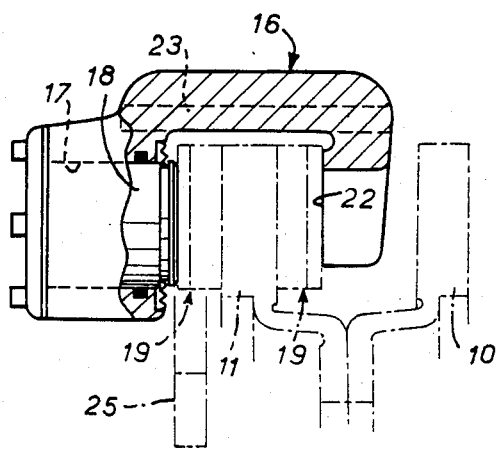
FIG. 2 is a view of one of the calipers of this brake in cross-section along the line II—II of FIG. 1.
Figures 4A, 4B:
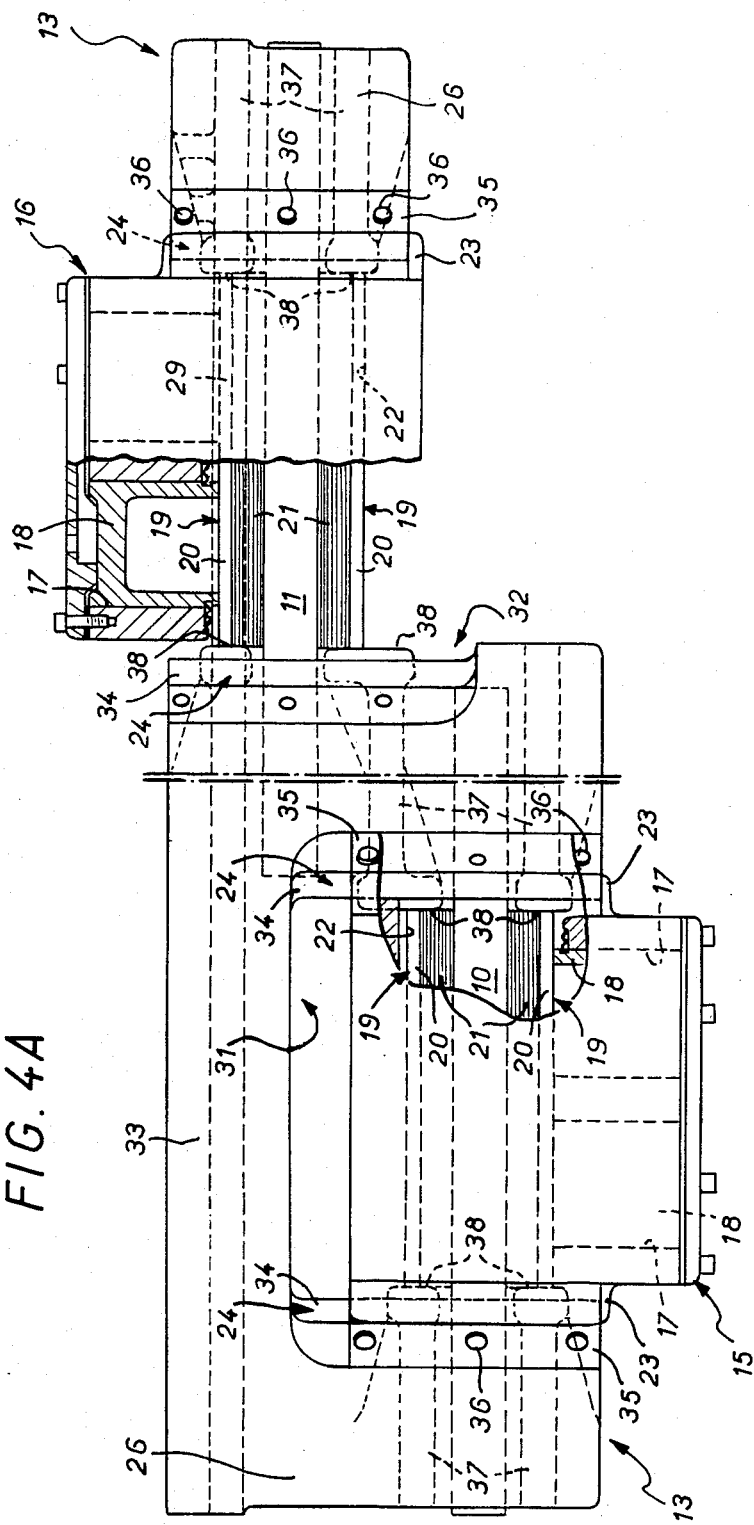
FIGS. 4A, 4B show the brake laterally in the direction of the arrow IVA and the arrow IVB, respectively, of FIG. 1, with partial cut-aways.
Figure 5:
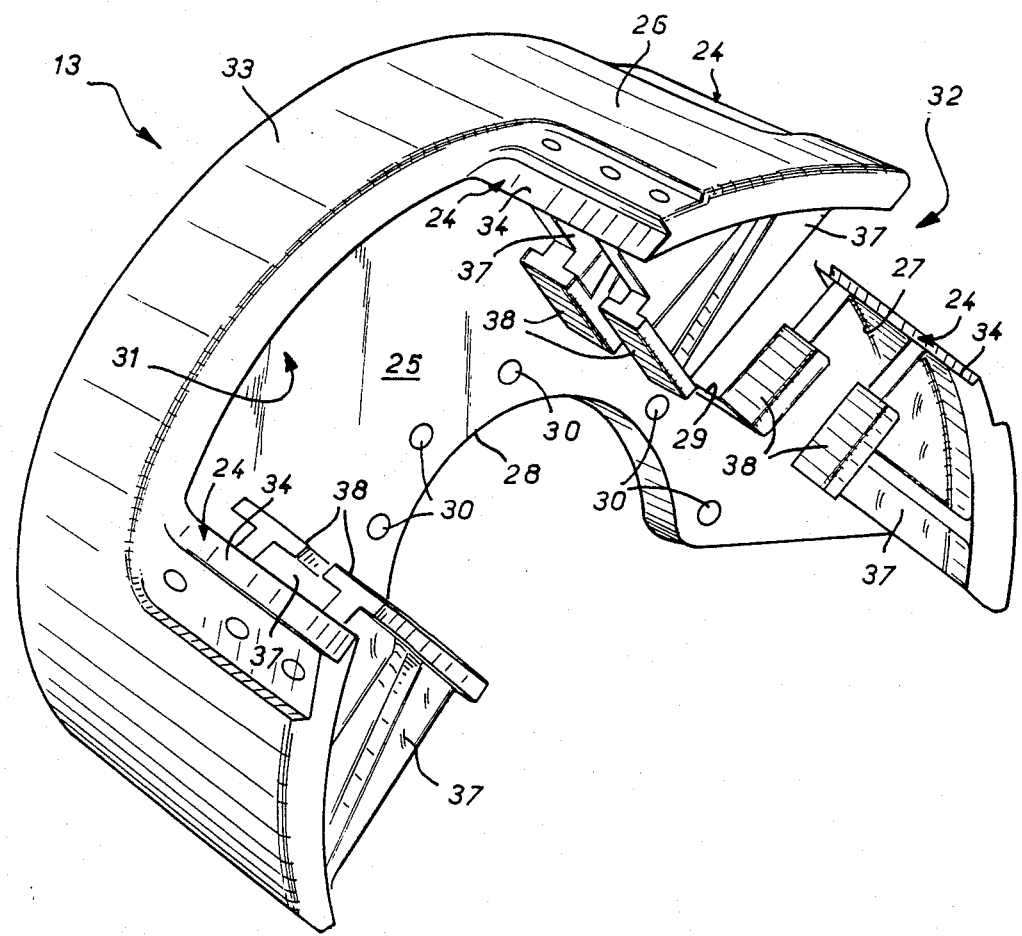
FIGS. 5 and 6 are views in perspective of the fixed support of the brake.

The embodiment shown in FIGS. 1 to 6 relates, by way of a non-limiting example, to an application of the invention to a twin-disc brake for a lorry wheel.

The hub M of the wheel R (FIG. 3) is mounted so as to rotate, via bearings L, on the journal T of the fixed stub axle F of the wheel R.

The twin-disc brake according to the invention (FIGS. 1 to 6) comprises two adjacent rotating discs 10 and 11 firmly fixed, by means of screws 12, to the hub M of the wheel R. The brake also comprises, on the one hand, a fixed support 13 firmly fixed to the fixed stub axle F by means of screws 14, and, on the other hand, two angularly fixed calipers 15, 16 associated respectively with the two discs 10 and 11 and mounted so as to slide axially on the support 13. The latter is common to the two calipers 15 and 16.

Each caliper 15, 16 comprises two hydraulic cylinders 17, which receive pistons 18 capable of clamping brake pads 19 axially on either side of the corresponding disc 10, 11. Each pad 19 comprises a support 20 coated with a friction lining 21. The pistons 18 cooperate with the support 20 of the pad 19, whilst the friction lining 21 cooperates frictionally with the corresponding disc 10, 11.

The cylinders 17 of each caliper 15, 16 are arranged on only one side, namely the outside, of the associated disc 10, 11. On the other side, the caliper 15, 16 presents a reaction face 22 for the pads 19.

The calipers 15, 16 consist of parts in the form of riders, having the cylinders 17 on one side and the reaction face 22 on the other side. Each caliper 15, 16 possesses lateral blocks in the form of tenons 23 to enable it to be mounted so as to slide along guides in the form of mortices 24 in the support 13.

The support 13 (FIGS. 5 and 6) constitutes the main part of the twin-disc brake.

The support 13, in the general shape of a perforated half-drum, has a construction which is at one and the same time compact, robust and light. It extends over an angular sector of about 180° and essentially comprises a flange 25 perpendicular to the axis, and a cylindrical rim 26 firmly fixed to this flange 25.

Figure 6:
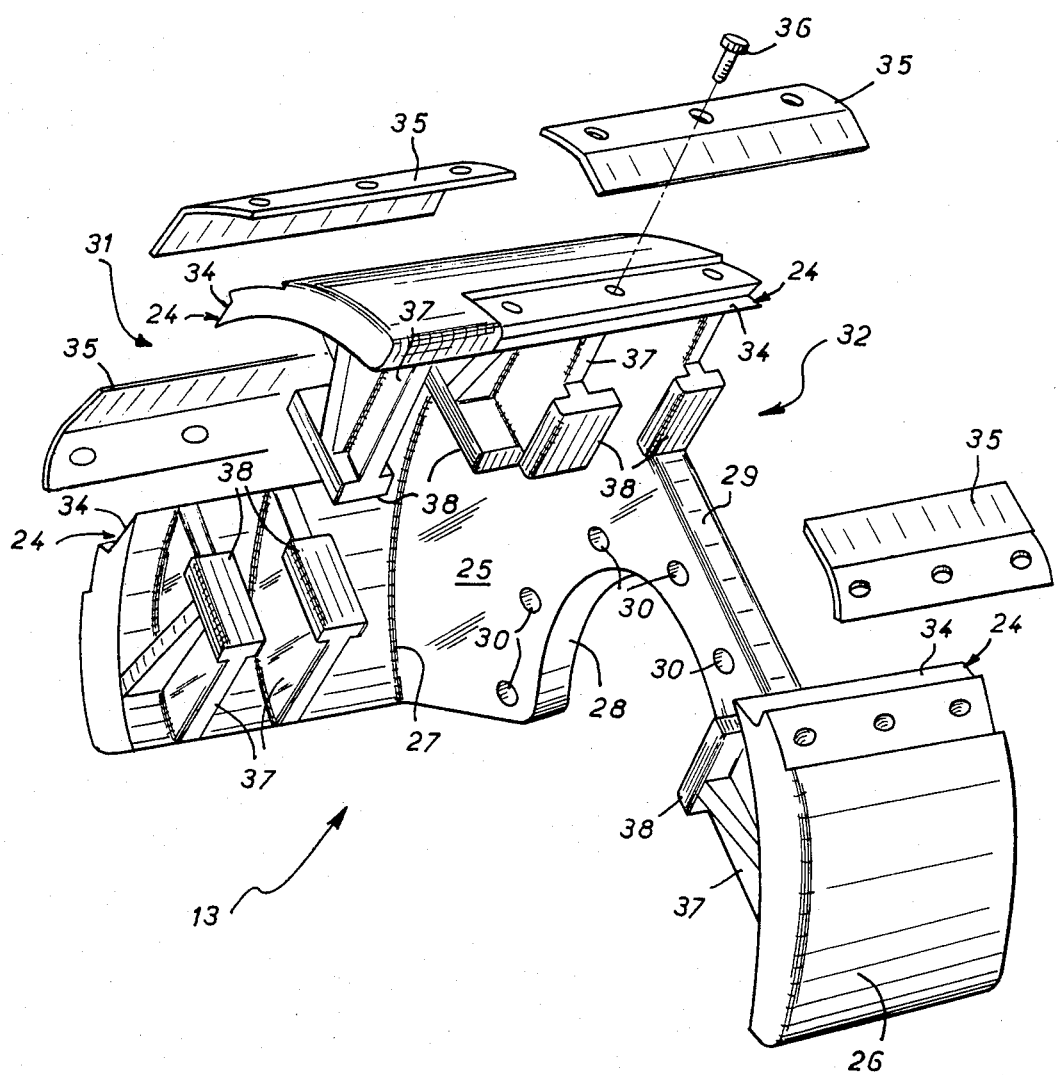

The flange 25 has a semi-annular shape defined between a semicircular outer contour 27 and a semicircular inner contour 28 (FIG. 6). The flange 25 (FIGS. 5 and 6) possesses a wide notch 29 (FIG. 6), which is open along the outer contour 27, and a circular row of holes 30 in the vicinity of the inner contour 28 for fixing to the fixed stub axle F by means of the screws 14. The flange 25 extends in the vicinity of and next to the disc 10.

The cylindrical rim 26 possesses two openings 31 and 32 for the housing of the calipers 15 and 16.

The opening 31 consists of a notch which is separated from the flange 25 (FIG. 5) by a cylindrical rim 33. The other opening 32 consists of a wide slot adjacent to the notch 29 in the flange 25.

The guides 24 in the support 13, which receive the blocks 23 on the calipers 15, 16, are defined by pairs of guide bearings 34 which run along the edges of the openings 31 and 32. To form the guide 24, each guide bearing 24 is complemented by a cover 35 fixed to the rim 26 by means of screws such as the screw 36 (FIG. 6).

The rim 26 surrounds the two discs 10 and 11 over an angular sector of about 180°.

Moreover, the common fixed support 13 comprises gussets 37 perpendicular to the axis. The flange 25 and these gussets 37 possess tangentially acting thrust bearings 38 for the pads 19.

It will be appreciated that the brake described with reference to FIGS. 1 to 6 has a particularly simple and convenient construction with a reduced bulk both circumferentially and axially. It benefits from good cooling by virtue of the fact that the support 13 extends over an angular sector of about 180°. The two calipers 15 and 16 are on the whole identical, which permits standardised manufacture. The mounting of these calipers 15, 16 so that they can slide along the guides 24 in the support 13 is excellent. Each caliper 15, 16, which comprises cylinders 17 on only one side, has a simplified and inexpensive construction.

The operation of the twin-disc brake is apparent from the above description.

When the hydraulic cylinders 17 are depressurised, the pistons 18 do not press on the pads 19 and the latter do not clamp the discs 10 and 11. The brake is off. When the hydraulic cylinders 17 are pressurised, the pistons 18 exert a thrust on the pads 19 which are adjacent to these pistons 18, whilst the other pads 19 are clamped against the reaction face 22. The various pads 19 are pressed against the thrust bearings 38. The calipers 15, 16 can move freely with axial sliding, and permit a suitable gripping of each disc 10, 11 between the pads 19. The brake is on.

We claim:

1. A twin-disc brake comprising two axially adjacent rotatable brake discs, two calipers angularly fixed relative to each other and associated with the respective discs, each of said calipers having hydraulic cylinder means receiving piston means for directly applying pad means axially against one side of the associated disc, a fixed support common to both of said calipers and extending over an angular sector of about 180°, each of said calipers comprising a C-shaped member straddling the associated disc, guide means defined on said common fixed support for guiding each of said calipers for axial sliding movement thereon, said calipers being disposed circumferentially adjacent each other on said common fixed support, the hydraulic cylinder means of each of said calipers being arranged on only said one side of the associated disc, each of said calipers having a reaction face cooperable with other pad means for applying said other pad means against the other side of its associated disc.

2. A twin-disc brake according to claim 1, wherein said common fixed support comprises a flange perpendicular to the axis of said brake, arranged adjacent to one of the discs, and said guide means comprises two pairs of guide bearing surfaces fixed to said flange for guiding the respective calipers.

3. A twin-disc brake according to claim 2, wherein said bearing surfaces of one of the pairs of guide bearing surfaces, associated with one of said calipers, run along axial edges of a housing provided in said common fixed support for said one caliper, said housing being closed on one end by said flange, and said bearing surfaces of the other pair of guide bearing surfaces, associated with said other caliper, run along axial edges of another housing provided in said common fixed support for said other caliper, said other housing being open at both ends.

4. A twin-disc brake according to claim 2, wherein said common fixed support comprises a part-cylindrical rim fixed to said flange, said two pairs of guide bearing surfaces being formed respectively by axial edges of two circumferential openings provided in said cylindrical rim.

5. A twin-disc brake according to claim 4, wherein said part-cylindrical rim extends over the angular sector of about 180° of said common fixed support, around said discs.

6. A twin-disc brake according to claim 4, wherein one of said openings is a notch closed at one end adjacent said flange by a cylindrical rim, and the other of said openings comprises a slot opening into a notch in said flange.

7. A twin-disc brake according to claim 2, wherein said common fixed support includes gussets lying generally perpendicular to the axis of said brake, thrust bearing surfaces for the pad means being provided on said gussets and said flange.

8. A twin-disc brake according to claim 1, wherein said hydraulic cylinder means of each of said calipers are arranged on the axially outer side of the associated disc.

9. A twin-disc brake according to claim 1, wherein said calipers are of substantially identical configuration.

10. A twin-disc brake according to claim 1, wherein each of said C-shaped calipers comprises a pair of leg portions interconnected by a bight portion, each said bight portion being cooperable with the associated guide means for axial sliding movement therein, one of said leg portions of each of said C-shaped calipers accommodating the associated hydraulic cylinder means with the piston means, and the other of said leg portions defining the associated reaction face.

11. A twin-disc brake according to claim 10, wherein said guide means and the cooperable portions of the respective bight portions extend substantially parallel to the axis of the brake.

12. A twin-disc brake according to claim 11, wherein said common fixed support comprises a flange perpendicular to the axis of said brake, arranged adjacent to one of said discs, and said guide means comprises two pairs of guide bearing surfaces fixed to said flange for guiding the respective calipers.

13. A twin-disc brake according to claim 12, wherein said bearing surfaces of one of the pairs of guide bearing surfaces, associated with one of said calipers, run along axial edges of a housing provided in said common fixed support for said one caliper, said housing being closed on one end by said flange, and said bearing surfaces of the other pair of guide bearing surfaces, associated with said other caliper, run along axial edges of another housing provided in said common fixed support for said other caliper, said other housing being open at both ends.

14. A twin-disc brake according to claim 12, wherein said common fixed support comprises a part-cylindrical rim fixed to said flange, said two pairs of guide bearing surfaces being formed respectively by axial edges of two circumferential openings provided in said cylindrical rim.

15. A twin-disc brake according to claim 14, wherein said part-cylindrical rim extends over the angular sector of about 180° of said common fixed support, around said discs.

16. A twin-disc brake according to claim 14, wherein one of said openings is a notch closed at one end adjacent said flange by a cylindrical rim, and the other of said openings comprises a slot opening into a notch in said flange.

17. A twin-disc brake according to claim 12, wherein said common fixed support includes gussets lying generally perpendicular to the axis of said brake, thrust bearing surfaces for the pad means being provided on said gussets and said flange.

18. A twin-disc brake according to claim 10, wherein said hydraulic cylinder means of each of said calipers are arranged on the axially outer side of the associated disc.

19. A twin-disc brake according to claim 10, wherein said calipers are of substantially identical configuration.

* * * * *